US007397207B2

(12) United States Patent
Sun

(10) Patent No.: US 7,397,207 B2
(45) Date of Patent: Jul. 8, 2008

(54) ELECTRIC SUPERCHARGER FOR VEHICLE

(75) Inventor: Jianpeng Sun, Wuhan (CN)

(73) Assignee: Weihai PTC International Co., Ltd., Weihai, Shangdong province (CN)

( * ) Notice: Subject to any disclaimer, the term of this patent is extended or adjusted under 35 U.S.C. 154(b) by 129 days.

(21) Appl. No.: 11/398,513

(22) Filed: Apr. 4, 2006

(65) Prior Publication Data

US 2006/0243261 A1 Nov. 2, 2006

(30) Foreign Application Priority Data

Apr. 4, 2005 (CN) ........................ 2005 2 0095783

(51) Int. Cl.
*H02P 1/00* (2006.01)

(52) U.S. Cl. ........................ 318/139; 318/254; 318/603; 123/335; 123/406.13; 123/618

(58) Field of Classification Search ................. 318/138, 318/245, 254, 439, 599, 603; 123/179.5, 123/335, 475, 406.13, 598, 606, 610, 618
See application file for complete search history.

(56) References Cited

U.S. PATENT DOCUMENTS

| | | | | | |
|---|---|---|---|---|---|
| 3,913,600 | A | * | 10/1975 | Cox | 137/6 |
| 4,068,643 | A | * | 1/1978 | McKechnie | 123/604 |
| 4,121,553 | A | * | 10/1978 | Hasegawa | 123/406.6 |
| 4,131,098 | A | * | 12/1978 | Daniels et al. | 123/406.13 |
| 4,153,032 | A | * | 5/1979 | Chateau | 123/610 |
| 4,359,998 | A | * | 11/1982 | Topic | 123/606 |
| 4,395,999 | A | * | 8/1983 | McKechnie | 123/618 |
| 4,403,970 | A | * | 9/1983 | Dretzka et al. | 440/75 |
| 4,462,356 | A | * | 7/1984 | Hirt | 123/335 |
| 4,543,936 | A | * | 10/1985 | Gardner et al. | 123/475 |
| 4,977,877 | A | * | 12/1990 | Dykstra | 123/335 |
| 5,109,827 | A | * | 5/1992 | Nobe et al. | 123/618 |
| 5,456,241 | A | * | 10/1995 | Ward | 123/598 |
| 5,526,785 | A | * | 6/1996 | Masters | 123/335 |
| 6,125,808 | A | * | 10/2000 | Timewell | 123/179.5 |

* cited by examiner

*Primary Examiner*—Paul Ip
(74) *Attorney, Agent, or Firm*—Raymond Y. Chan; David and Raymond Patent Firm

(57) ABSTRACT

The electric supercharger includes a vehicle connector, an impulse signal generator empowered by a power source, and a signal amplifier. The vehicle connector has a positive terminal and a negative terminal for electrically connecting to an electrical source of said vehicle. The impulse signal generator, which is electrically linked to the vehicle connector for receiving an impulse signal from the electrical source of the vehicle, includes a signal integral circuit stably generating a rectangular impulse signal. The signal amplifier electrically connects to the impulse signal generator to amplify the rectangular impulse signal and to send the amplified rectangular impulse signal back to sparkplugs and injectors of the vehicle through the vehicle connector for enhancing a combustion-efficiency of an engine of the vehicle.

10 Claims, 1 Drawing Sheet

ELECTRIC SUPERCHARGER FOR VEHICLE

BACKGROUND OF THE PRESENT INVENTION

1. Field of Invention

The present invention relates to an electric supercharger, and more particularly to an electric supercharger for vehicle which can improve engine ignition system and combustion-efficiency of the vehicle.

2. Description of Related Arts

Nowadays vehicle engine design and production have reached a very mature state. However, according to the variety of situations, most of the engines are not carrying out their best performance and results in an inefficient combustion process. The immediate direct effects are not enough power produced by the engine, weak acceleration, excessive carbon build up in sparkplugs, pollution and emission problem, and difficult to start engine. If the problem is not solved, excessive fuels are sent to the combustion chamber for combustion and will eventually lead to mechanical wears, loss of torque, and insufficient horsepower. These problems are hard to fix unless the engine is replaced. The engine is the most important and complicated part of a vehicle. Therefore, replace or repair for the engine is very time consuming and expensive.

SUMMARY OF THE PRESENT INVENTION

The main object of the present invention is to provide an electric supercharger for vehicle which enhances the efficiency of the combustion process.

Another object of the present invention is to provide an electric supercharger for vehicle which increases the torque and horsepower of the engine.

Another object of the present invention is to provide an electric supercharger for vehicle which decreases the emission amount.

Another object of the present invention is to provide an electric supercharger for vehicle which electrically protects the surrounding electronic units.

Another object of the present invention is to provide an electric supercharger for vehicle which offers a more responsive and reliable starter device for the engine.

Another object of the present invention is to provide an electric supercharger for vehicle which stabilizes the RPM of the engine.

Another object of the present invention is to provide an electric supercharger for vehicle which enhances the acceleration of the vehicle.

Accordingly, in order to accomplish the above objects, the present invention provides an electric supercharger for vehicle, comprising:

a vehicle connector having a positive terminal and a negative terminal for electrically connecting to an electrical source of the vehicle;

an impulse signal generator, which is electrically linked to the vehicle connector for receiving an impulse signal from the electrical source of the vehicle, comprising a signal integral circuit stably generating a rectangular impulse signal; and a signal amplifier electrically connecting to the impulse signal generator to amplify the rectangular impulse signal and to send the amplified rectangular impulse signal back to sparkplugs and injectors of the vehicle through the vehicle connector for enhancing a combustion-efficiency of an engine of the vehicle.

DETAILED DESCRIPTION OF THE PREFERRED EMBODIMENT

Figure 1:
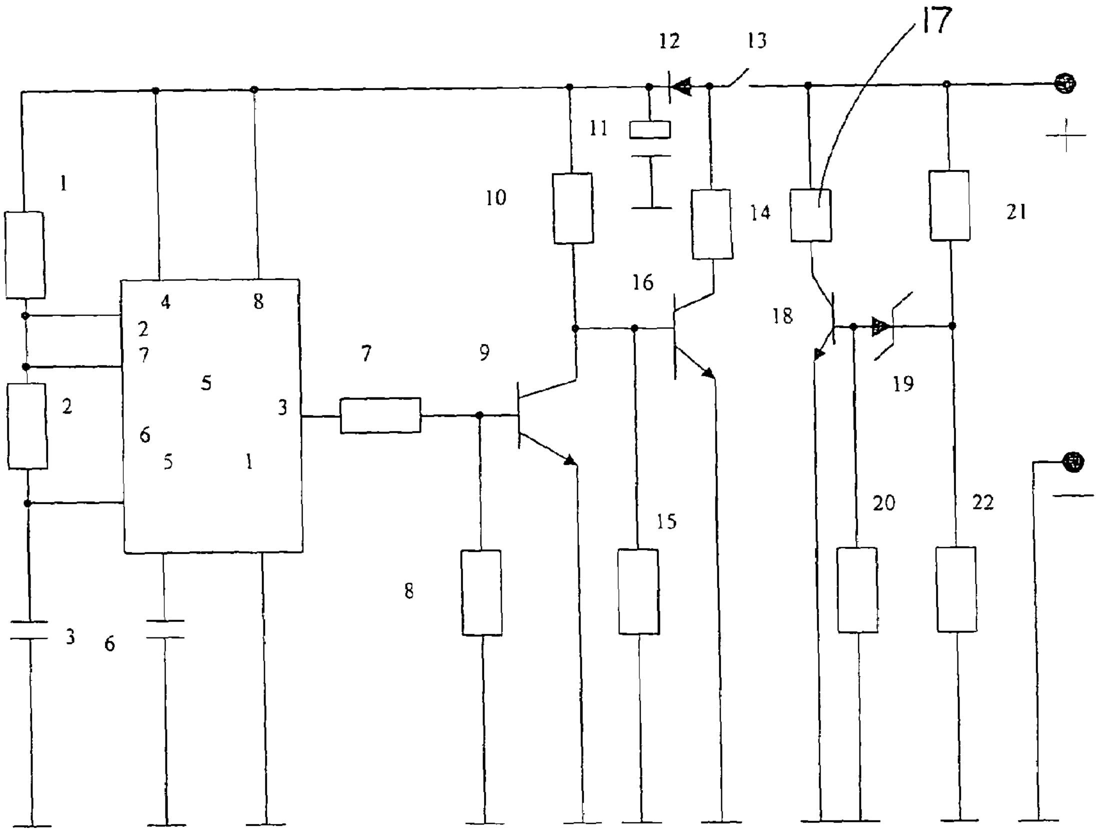
FIG. 1 illustrates the electrical circuit connection of the present invention.

According to FIG. 1 of the drawing, the present invention provides an electric supercharger for vehicle. The electric supercharger comprises a vehicle connector, an impulse signal generator empowered by a power source, and a signal amplifier.

The vehicle connector has a positive terminal and a negative terminal for electrically connecting to an electrical source of the vehicle. The impulse signal generator, which is electrically linked to the vehicle connector for receiving an impulse signal from the electrical source of the vehicle, comprises a signal integral circuit stably generating a rectangular impulse signal. The signal amplifier electrically connects to the impulse signal generator to amplify the rectangular impulse signal and to send the amplified rectangular impulse signal back to sparkplugs and injectors of the vehicle through the vehicle connector for enhancing a combustion-efficiency of an engine of the vehicle.

The impulse signal generator comprises a first resistor 1, a second resistor 2, a first capacitor 3, a NE555 integrated circuit 5 as the signal integral circuit, a second capacitor 6, a third resistor 7, and a fourth resistor 8. The signal amplifier comprises a first 2SC1825 triode 9, a fifth resistor 10, a filtering capacitor 11, a diode 12, a sixth resistor 14, a seventh resistor 15, a second 2SC1825 triode 16, a relay 17.

The electric supercharger further comprises a voltage recognizing automatic switch having a switch 13, a relay 17, a triode 18, a voltage stabilizing diode 19, a ninth resistor 21, and a tenth resistor. Accordingly, the voltage recognizing automatic switch electrically connects between the vehicle connector and the impulse signal generator, wherein when the engine of the vehicle is turned on, the voltage recognizing automatic switch automatically activates the impulse signal generator for receiving the impulse signal from the electrical source of the vehicle.

A second and a seventh pin of the NE555 integrated circuit 5 are connected to an end of the first resistor 1, the end of the first resistor 1 is further connected to an end of the second resistor 2, an opposite end of the first resistor 1 is connected to the negative terminal of the diode 12, an opposite end of the second resistor 2 is connected to a sixth pin of the NE555 integrated circuit 5 and an end of the first capacitor 3, an opposite end of the first capacitor 3 is connected to the negative terminal of the power source, a fifth pin of the NE555 integrated circuit 5 is connected to the second capacitor 6 and is further connected to the negative terminal of the power source, a first pin of the NE555 integrated circuit 5 is connected to the negative terminal of the power source, a fourth and an eighth pin of the NE555 integrated circuit 5 are connected to the negative terminal of the diode 12, a third pin of the NE555 integrated circuit 5 is connected to an end of the third resistor 7; an opposite end of the third resistor 7 is connected to the base terminal of the first 2SC1825 triode 9 and an end of the fourth resistor 8, an opposite end of the fourth resistor 8 is connected to the negative terminal of the power source, an emitting terminal of the first 2SC1825 triode 9 is connected to the negative terminal of the power source, a collecting terminal of the first 2SC1825 triode 9 is connected to an end of the fifth resistor 10, an end of the seventh resistor 15, and a base terminal of the second 2SC1825 triode 16; an opposite end of the fifth resistor 10 is connected to the negative terminal of the diode 12, an opposite end of the seventh resistor 15 is connected to the negative terminal of the power source, an emitting terminal of the second 2SC1825 triode 16 is connected to the negative terminal of the power source, a collecting terminal of the second 2SC1825 triode 16 is connected to an end of the sixth resistor 14, an opposite end of the sixth resistor 14 and the positive terminal of the diode 12 are connected to a connecting point of the switch 13 of the relay 17, a second connecting point of the switch 13 of the relay 17 and a connecting point of the circuit of the relay 17 are connected to the positive terminal of the power source, a second connecting point of the circuit of the relay 17 is connected to the negative terminal of the power source; the negative terminal of the diode 12 is connected to the filtering capacitor 11 and then is further connected to the negative terminal of the power source; the positive terminal and the negative terminal of the power source are connected to the positive terminal and the negative terminal of the battery of the vehicle in a parallel manner respectively.

The RC circuit with a time constant formed by the first resistor 1, the second resistor 2, and the first capacitor 3 creates a rectangular impulse signal through the third pin of the NE555 integrated circuit 5. The rectangular impulse signal is amplified by the first 2SC1825 triode 9 to form the modified impulse signal and is sent to the positive terminal of the power source of the vehicle through the second 2SC1825 triode 16. The modified impulse signal is characterized by a stable fixed value and is also highly centralized and large in magnitude. The modified impulse signals are then sent to the igniting end of the spark plugs and can minimize the size of the mist particle sprayed by the fuel injector into the combustion chamber. The modified impulse signals provide a stronger ignition sparks for the spark plugs so that the combustion process is more efficient. The rate of carbon build-up can be reduced. The torque and horsepower can be increased and thus enhancing the overall performance of the vehicle.

A second connecting point of the circuit of the relay 17 is connected to a collecting terminal of the triode 18, an emitting terminal of the triode 18 is connected to the negative terminal of the power source, a base terminal of the triode 18 is connected to the positive terminal of the voltage stabilizing diode 19 and an end of the eighth resistor 20, a second end of the eighth resistor 20 is connected to the negative terminal of the power source, the negative terminal of the voltage stabilizing diode 19 is connected to an end of a ninth resistor 21 and an end of the tenth resistor 22, a second end of the ninth resistor 21 is connected to the positive terminal of the power source, a second end of the tenth resistor 22 is connected to the negative terminal of the power source. When the engine is started, the alternator of the vehicle outputs≧than 12.4V. The voltage passes through the ninth resistor 21 and the tenth resistor 22. The voltage stabilizing diode 19 is then penetrated and current passes through the triode 18 and turns on the relay 17. As a result, the switch 13 will turn to the on position and the rest of the circuit is activated which allows the impulse signal generator to provide the modified impulse signals to the sparkplugs and injectors of the vehicle. When the engine is turned off, the voltage is ≦than 12.2V. After passing through the ninth resistor 21 and the tenth resistor 22, the voltage is not enough to penetrate through the voltage stabilizing diode 19. Therefore, the current will not be able to pass through the triode 18 and the relay 17 will be turned off. Finally, the switch 13 of the relay 17 will turn to the off position and disconnect the rest of the circuit to the power source and stop the electric supercharger for vehicle to function.

It is worth to mention that the voltage recognizing automatic switch also ensures that the electric supercharger for vehicle will not be draining battery from the battery of the vehicle when the engine is turned off.

According to the preferred embodiment, the diode 12 is a circuit protecting diode electrically connecting between the vehicle connector and the impulse signal generator for preventing a short circuit of the impulse signal generator when the vehicle connector is connected to the electrical source in an improper manner. It is worth to mention that when the electrical terminals are reversely connected, i.e. the improper connecting manner, the diode 12 will deactivate the circuit from the power source to prevent any electrical damages of the system. Accordingly, the impulse signal generator and the voltage recognizing automatic switch are integrated to form an integrated circuit as shown in FIG. 1 of the drawing.

It is worth to mention that the vehicle connector can be connected to a cigarette lighter plug or a battery of the vehicle as the electric source.

It will thus be seen that the objects of the present invention have been fully and effectively accomplished. The embodiment has been shown and described for the purposes of illustrating the functional and structural principles of the present invention and is subject to change without departure from such principles. Therefore, this invention includes all modifications encompassed within the spirit and scope of the following claims.

What is claimed is:

1. An electric supercharger for vehicle, comprising:

a first resistor, a second resistor, a first capacitor, a NE555 integrated circuit having first through eighth pin, a second capacitor, a third resistor, a fourth resistor, a first 2SC1825 triode, a fifth resistor, a filtering capacitor, a diode, a sixth resistor, a seventh resistor, a second 2SC1825 triode, a relay; said second and said seventh pin of said NE555 integrated circuit are connected to an end of said first resistor, said end of said first resistor is further connected to an end of said second resistor, an opposite end of said first resistor is connected to a negative terminal of said diode, an opposite end of said second resistor is connected to said sixth pin of said NE555 integrated circuit and an end of said first capacitor, an opposite end of said first capacitor is connected to a negative terminal of said power source, said fifth pin of said NE555 integrated circuit is connected to said second capacitor and is further connected to said negative terminal of said power source, said first pin of said NE555 integrated circuit is connected to said negative terminal of said power source, said fourth and said eighth pin of said NE555 integrated circuit are connected to said negative terminal of said diode, said third pin of said NE555 integrated circuit is connected to an end of said third resistor; an opposite end of said third resistor is connected to said base terminal of said first 2SC1825 triode and an end of said fourth resistor, an opposite end of said fourth resistor is connected to said negative terminal of said power source, an emitting terminal of said first 2SC1825 triode is connected to said negative terminal of said power source, a collecting terminal of said first 2SC1825 triode is connected to an end of said fifth resistor, an end of said seventh resistor, and a base terminal of said second 2SC1825 triode; an opposite end of said fifth resistor is connected to said negative terminal of said diode, an opposite end of said seventh resistor is connected to said negative terminal of said power source, an emitting terminal of said second 2SC1825 triode is connected to said negative terminal of said power source, a collecting terminal of said second 2SC1825 triode is connected to an end of said sixth resistor, an opposite end of said sixth resistor and a positive terminal of said diode are connected to a connecting point of said switch, a second connecting point of said switch of said relay and a connecting point of said circuit of said relay are connected to said positive terminal of said power source, a second connecting point of said circuit of said relay is connected to said negative terminal of said power source; said negative terminal of said diode is connected to said filtering capacitor and then is further connected to said negative terminal of said power source; said positive terminal and said negative terminal of said power source are connected to said positive terminal and said negative terminal of a battery of said vehicle in a parallel manner respectively; whereby said battery of said vehicle provides a power source to said electric supercharger for vehicle, a rectangular impulse signal is created by said NE555 integrated circuit, said rectangular impulse signal is then amplified by said first 2SC1825 triode to form a modified impulse signal, said modified impulse signal is then sent to sparkplugs and injectors of said vehicles to enhance a combustion efficiency of said engine of said vehicle.

2. The electric supercharger, as recited in claim 1, further comprising a voltage recognizing automatic switch having a switch, a relay, a triode 18, a voltage stabilizing diode, a ninth resistor, and a tenth resistor, wherein another connecting point of the circuit of said replay is connected to a collecting terminal of said triode, an emitting terminal of said triode is connected to said negative terminal of said power source, a base terminal of said triode is connected said positive terminal of said voltage stabilizing diode and one end of said eighth resistor, an opposite end of said eighth resistor is connected to the negative terminal of said power source, said negative terminal of said voltage stabilizing diode is connected to and end of said ninth resistor and an end of said tenth resistor, an opposite end of said ninth resistor is connected to said positive terminal of said power source, an opposite end of said tenth resistor is connected to said negative terminal of said power source.

3. The electric supercharger, as recited in claim 2, further comprising a voltage recognizing automatic switch electrically connecting between said vehicle connector and said impulse signal generator, wherein when said engine of said vehicle is turned on, said voltage recognizing automatic switch automatically activates said impulse signal generator for receiving said impulse signal from said electrical source of said vehicle.

4. The electric supercharger, as recited in claim 1, wherein said power source is connected to a cigarette lighter plug or a battery of said vehicle as said electric source thereof.

5. The electric supercharger, as recited in claim 4, further comprising a voltage recognizing automatic switch electrically connecting between said vehicle connector and said impulse signal generator, wherein when said engine of said vehicle is turned on, said voltage recognizing automatic switch automatically activates said impulse signal generator for receiving said impulse signal from said electrical source of said vehicle.

6. The electric supercharger, as recited in claim 5, wherein said vehicle connector is electrically connected to said electrical source of said vehicle in parallel connection.

7. The electric supercharger, as recited in claim 6, wherein said vehicle connector is electrically connected to a battery of said vehicle as said electric source thereof.

8. The electric supercharger, as recited in claim 6, wherein said vehicle connector is electrically connected to a cigarette lighter plug of said vehicle as said electric source thereof.

9. The electric supercharger, as recited in claim 6, further comprising a circuit protecting diode electrically connecting between said vehicle connector and said impulse signal generator for preventing a short circuit of said impulse signal generator when said vehicle connector is connected to said electrical source in an improper manner.

10. The electric supercharger, as recited in claim 1, further comprising a voltage recognizing automatic switch electrically connecting between said vehicle connector and said impulse signal generator, wherein when said engine of said vehicle is turned on, said voltage recognizing automatic switch automatically activates said impulse signal generator for receiving said impulse signal from said electrical source of said vehicle.

* * * * *